United States Patent
Wagner et al.

(10) Patent No.: US 9,902,216 B2
(45) Date of Patent: Feb. 27, 2018

(54) METHOD OF ASSOCIATING TIRE PRESSURE CONTROL APPARATUSES TO WHEEL POSITIONS

(71) Applicant: Huf Hülsbeck & Fürst GmbH & Co. KG, Velbert (DE)

(72) Inventors: Markus Wagner, Ludwigsburg (DE); Peter Brand, Kieselbronn (DE); Markus Alexander, Karlsruhe (DE)

(73) Assignee: HUF HÜLSBECK & FÜRST GMBH & CO. KG, Velbert (DE)

( * ) Notice: Subject to any disclaimer, the term of this patent is extended or adjusted under 35 U.S.C. 154(b) by 352 days.

(21) Appl. No.: 14/705,803

(22) Filed: May 6, 2015

(65) Prior Publication Data
US 2015/0231935 A1 Aug. 20, 2015

Related U.S. Application Data

(63) Continuation of application No. PCT/EP2013/072991, filed on Nov. 5, 2013.

(30) Foreign Application Priority Data

Nov. 8, 2012 (DE) .......... 10 2012 110 689

(51) Int. Cl.
*B60C 23/04* (2006.01)
*G01P 3/00* (2006.01)
*G01P 15/00* (2006.01)

(52) U.S. Cl.
CPC ............. *B60C 23/04* (2013.01); *G01P 3/00* (2013.01); *G01P 15/00* (2013.01)

(58) Field of Classification Search
CPC . B60C 23/04; B60C 23/0408; B60C 23/0411; B60C 23/0493; G01P 3/00; G01P 15/00
See application file for complete search history.

(56) References Cited

U.S. PATENT DOCUMENTS 4,966,034 A * 10/1990 Bock .................. B60C 23/0408
 73/146.5
6,034,597 A * 3/2000 Normann ............ B60C 23/0416
 340/442

(Continued)

FOREIGN PATENT DOCUMENTS

DE 197 34 323 A1 2/1999
DE 10 2010 038136 A1 4/2012

(Continued)

*Primary Examiner* — Nikolay Yushin
(74) *Attorney, Agent, or Firm* — Hackler Daghighian Martino & Novak

(57) ABSTRACT

Tire pressure control devices include first sensors to deliver repeatedly a measured value M1 for the rotation speed of the wheel. A measurand, from which the rotation speed of the associated wheel can be derived, is detected in a pointwise manner by means of a second sensor over a predetermined rotation angle φ of the wheel as a function of time, is subjected to a low pass filtering in a subsequent first time interval Δt1 and from the filtered development of the measurand a second measured value M2 is determined, which is a measurement for the rotation speed or respectively for the angular speed of the associated wheel. Each tire pressure control device transmits at the end of a second time interval Δt2 the second measured value M2 together with an identification of the tire pressure control device to a central unit. Comparing M1 and M2 determines wheel position.

28 Claims, 3 Drawing Sheets

(56) References Cited

U.S. PATENT DOCUMENTS

| | | | |
|---|---|---|---|
| 6,340,930 B1* | 1/2002 | Lin | B60C 23/0416 340/442 |
| 6,922,140 B2* | 7/2005 | Hernando | B60C 23/0416 340/444 |
| 7,053,761 B2* | 5/2006 | Schofield | B60C 23/0401 340/442 |
| 7,205,886 B2* | 4/2007 | Kin | B60C 23/061 340/442 |
| 8,013,725 B2* | 9/2011 | Murata | B60C 23/0444 340/447 |
| 8,742,914 B2* | 6/2014 | Deniau | B60C 23/0462 340/442 |
| 2011/0313623 A1 | 12/2011 | Greer et al. | |
| 2012/0253590 A1 | 10/2012 | Fink | |

FOREIGN PATENT DOCUMENTS

| | | |
|---|---|---|
| EP | 0 806 306 A2 | 11/1997 |
| EP | 2 450 202 A1 | 5/2012 |

\* cited by examiner

METHOD OF ASSOCIATING TIRE PRESSURE CONTROL APPARATUSES TO WHEEL POSITIONS

CROSS-REFERENCE TO RELATED APPLICATIONS

This continuation application claims priority to PCT/EP2013/072991 filed on Nov. 5, 2013 which was published as WO 2014/072269 A1 and also the German application number 10 2012 110 689.4 filed on Nov. 8, 2012, the contents of which are fully incorporated herein with these references.

DESCRIPTION

Field of the Invention

The invention relates to an automatic method for the allocating of tire pressure control devices of a tire pressure control system of a vehicle to the different positions of a number of wheels of the vehicle.

Background of the Invention

From DE 197 34 323 B4 an allocation method is known, according to which a revolution sensor, e.g. an acceleration sensor, provided in a tire pressure control device, sends a telegram to a central unit in a first time interval at a particular angular position of the wheel, and in a second time interval sends a second telegram to the central unit at an angular position of the wheel different therefrom. Both telegrams contain an identification which is characteristic for the respective tire pressure control device and for all other tire pressure control devices is different therefrom. The angular offset of the two angular positions, in which the two telegrams are sent, is predetermined and known in the central unit.

In the time span between the two telegrams, the number of revolutions of the wheels is measured by means of ABS sensors, e.g. by counting the teeth, running past the sensor, of a toothed ring which is rotating together with the wheel. From the number of teeth which is thus obtained, the greatest possible whole-number multiple of the teeth present on the ABS toothed ring is deducted. The number of teeth remaining thereafter represents an angular offset. The identification of the tire pressure control device is allocated to the position of the sensor of the four ABS sensors which provides the angular offset, which coincides with the angular offset which is predetermined by the tire pressure control device and known. This method has the disadvantage that the tire pressure control devices must send twice for each allocation attempt, also for allocation attempts without effect, when namely not all tire pressure control devices show different angular offsets. Allocation attempts without effect waste the energy which is stored in a non-exchangeable battery of the tire pressure control device and thereby reduce its lifespan.

From EP 0 806 306 B1 an allocation method is known, by which the same measurand, for example the wheel rotation speed, is to be measured with a sensor in the tire pressure control devices and with the ABS sensors. The measured values are transmitted to a central unit. In the central unit, measured values which were transmitted from the sensors in the tire pressure control devices and measured values which were delivered from the ABS sensors are compared with one another. With sufficient coincidence of one of the measured values from the tire pressure control devices with one of the measured values from the ABS, a correct allocation is decided upon. EP 0 806 306 B1 defines a sufficient coincidence such that the measured values of the sensors in the tire pressure control devices and of the ABS sensors coincide except for disparities which can not be avoided metrologically. A great deal of time can elapse until this criterion is fulfilled for all the wheels of a vehicle. Because, however, a tire pressure control system is relevant to safety, it is important to achieve the correct allocation automatically and as quickly as possible after the starting of a vehicle.

It may be one of many objects of the present invention to provide a further method for the allocating of tire pressure control devices to the different positions of a number of wheels of a vehicle, which can both take place automatically after each starting of a vehicle, and also leads rapidly to a result.

This object may be achieved by a method having the features indicated in Claim 1. Advantageous further developments of the method are the subject matter of the dependent claims.

SUMMARY OF THE INVENTION

For the method according to the invention, the vehicle has the following components:
  a number of first sensors, corresponding to the number of wheel positions, which are each fixedly allocated to one of the wheel positions and can detect the rotation speed or angular speed of the wheel which is mounted in the wheel position;
  a number of tire pressure control devices, coinciding with the number of the mounted wheels, which are mounted on the wheels rotating together with these, are provided with an individual identification and contain a second sensor for determining a measurand, from the chronological development of which the rotation speed of the respective wheel (revolutions of the wheel per unit of time) or the angular speed of the wheel can be derived; and
  a central unit, in which the allocation of the tire pressure control devices to respectively one wheel position, namely the identification of the tire pressure control device situated in the wheel position in connection with the associated wheel position, can be stored. It is known by the central unit which first sensor is allocated to which wheel position.

In the allocation method according to the invention, the first sensors deliver to the central unit directly or indirectly repeatedly, namely for successive time segments ΔT, a measured value M1, which is a measurement for the rotation speed or for the angular speed of the wheel to which the respective first sensor is allocated, and the tire pressure control devices send their individual identification to the central unit in chronological intervals.

In each rotating tire pressure control device:
  the development of the measurand, from which the rotation speed or the angular speed of the associated wheel can be derived, is detected pointwise by means of the second sensor over a predetermined rotation angle φ of the wheel as a function of time;
  in a first time interval $\Delta t_1$ a following the detection the chronological development of the measurand detected during the rotation of the wheel about the predetermined rotation angle φ is subjected to a low pass filtering and the result of the filtering is stored; and from the filtered development of the measurand a second measured value M2 is determined, which is a measurement for the rotation speed or respectively for the angular speed of the associated wheel in the range of the observed predetermined rotation angle φ.

Each tire pressure control device transmits the second measured value M2 together with its identification to the central unit at the end of a second time interval $\Delta t_1$, which begins simultaneously with the first time interval $\Delta t_1$ and the duration of which is not less than the first time interval $\Delta t_1$. Particularly, the first time interval $\Delta t_1$ and the second time interval $\Delta t_2$ coincide in duration and position.

In the central unit, as a result of this transmittal, the second measured values M2 transmitted by the tire pressure control devices are compared with the measured values M1 detected in a timely manner by the first sensors of all the wheels, and the identification of the tire pressure control device is respectively stored under that wheel position in which the measured value M1, delivered by a first sensor, best coincides with the second measured value M2 or—in other words—in which the measured value M1 delivered by a first sensor has the smallest deviation from the second measured value M2.

Measured values M1 and M2 can be deemed to be detected in a timely manner which have been detected in time periods, the duration of which under normal driving conditions justifies the assumption that the speed of the vehicle or respectively the rotation speed of the wheels concerned has not changed substantially in them. A substantial change would then be present if the deviation of the speed of the vehicle in the time period in which the measured value M1 was detected from the speed of the vehicle in the time period in which the measured value M2 was detected is so great that a reasonable allocation of a tire pressure control device to a particular wheel position would no longer be possible. This can be the case when the rotation speed differences due to change in the vehicle speed lie in the same order of magnitude as the rotation speed differences due to cornering or different slip of individual wheels, or are greater than these. For example, as first measured values M1 detected in a timely manner, those first measured values M1 can be selected, which were measured in several successive time segments $\Delta T$, which overlap with the second time interval $\Delta t_2$ or lie at the boundary thereof.

Also, as first measured values M1 detected in a timely manner, those first measured values M1 could be selected, which were measured in no more than five successive time segments $\Delta T$, wherein the end of the second time interval in which in a tire pressure control device a low pass filtering of the development of the measurand detected by the second sensor and the transmittal of the second measured value M2 as well as of the identification to the central unit takes place, lies in the no more than five time segments $\Delta T$ or at the boundary thereof.

The method according to the invention allocates each wheel mounted on the vehicle respectively to a wheel position. A spare wheel, which may also be carried, is not allocated as long as it does not come into use. If the spare wheel comes into use, it is automatically allocated in the next sequence of the method.

A radio connection, via which the respective tire pressure control device sends radiotelegrams to the central unit, can be established between the tire pressure control devices, which are mounted on the wheels, and the central unit, which is arranged anywhere in the vehicle. In the normal operation of the tire pressure control device, the radiotelegram contains as a message the individual identification of the tire pressure control device and information concerning the measured tire pressure and/or a measured tire pressure change. The telegram can contain further information, e.g. concerning the temperature of the tire pressure control device and concerning the charge state of a battery provided in the tire pressure control device. In addition, it is known to provide an acceleration sensor in the tire pressure control devices, which permits radial and/or tangential accelerations to be measured which occur at the tire pressure control device; from these, the rotation speed or angular speed of the wheel can be derived. It is known to the person skilled in the art and is described in the prior art how the rotation speed of the wheel can be determined from an acceleration measured in a tire pressure control device. For the allocation method according to the invention, the concern is merely that the tire pressure control devices can send telegrams which contain as a message the individual identification of the respective tire pressure control device and a measured value which is a measurement for the rotation speed or respectively for the angular speed of the associated wheel. This measured value is designated here as the "second measured value M2". This second measured value M2 is transmitted to the central unit by the tire pressure control device, together with the identification.

Further measured values, which are a measurement for the rotation speed or for the angular speed of the wheel and which are designated here as "first measured values M1", are delivered by first sensors, of which respectively one sensor is fixedly allocated to one of the wheel positions. The first measured values M1 are compared with the second measured values M2 detected in a timely manner and the identification of the tire pressure control device is respectively stored under the wheel position in which the measured value delivered by the first sensor best coincides with the measured value M2.

According to the invention, the development of the measurand delivered by the second sensor, from which the rotation speed or the angular speed of the associated wheel can be derived, is detected only pointwise over a predetermined rotation angle φ of the wheel as a function of time. The pointwise detected measurand is additionally subjected to a low pass filtering in the tire pressure control device. The low pass filtering has the advantage that interferences to the development of the measurand, which can be caused in particular by unevennesses of the road surface and by vibrations originating from the vehicle itself, can be eliminated entirely or partially by the filtering. The filtered development of the measurand is better suited than the unfiltered development of the measurand for deriving from the development the chronological change to the rotation angle position of the wheel and therefrom the rotation speed or the angular speed of the wheel, and for establishing the predetermined rotation angle of the wheel, over which the measurand delivered by the second sensor, and its development, are to be detected.

For the low pass filtering, it is advantageous if the development of the measurand is only detected pointwise. Digital low pass filters are known. As the present-day tire pressure control devices contain in any case a microprocessor or a microcontroller or a suchlike digital arithmetic circuit, the low pass filtering by means of a digital low pass filter in the tire pressure control device is readily possible; it merely requires a program by which the digital arithmetic circuit carries out the low pass filtering. From the filtered development of the measurand delivered by the second sensor, the rotation speed or the angular speed and the rotation angle φ of the wheel, over the range of which the development of the measurand is to be detected, can be determined very much more precisely than by means of an unfiltered development of the measurand. The low pass filtering provides a substantial contribution to carrying out the allocation method in a more time-saving manner and—with regard to the current supply of the tire pressure control device by a non-exchangeable battery—in a more energy-saving manner. The low pass filtering requires a certain duration and procedures, in order to synchronize the time segments with one another in which the first sensors and the second sensors detect their measurands. However, it has been found that this is not a disadvantage. On the contrary: Through the transmittal of the second measured values M2 to the central unit, which is delayed by the second time interval $\Delta t_2$, the point in time, derived from the end of the predetermined rotation angle $\phi$ of the wheel, at which the tire pressure control device transmits to the central unit a telegram which contains the second measured value M2 together with its identification, is shifted. This chronological shift by the second time interval $\Delta t_2$ leads to the angular position, in which the tire pressure control device sends, being shifted by an angle $\Delta\phi$. This angle $\Delta\phi$ is not constant, however, but depends on the speed of the vehicle or respectively on the rotation speed of the wheel. It is thereby prevented without further ado that the tire pressure control devices always send in the same angular position. This would namely be very disadvantageous, because the quality of the reception of the telegrams by the central unit depends on the angular position of the tire pressure control device at the moment of sending and varies from vehicle type to vehicle type. In the case of a transmittal of the telegrams from always the same rotation angle position of the tire pressure control device, the risk would exist that the reception in the central unit is so poor that only a portion of the emitted telegrams is received in a usable manner. To compensate, this would require more transmission processes, more time and a higher energy consumption in the tire pressure control devices, until a clear allocation of the tire pressure control devices to the wheel positions is reached. The introduction of a particular time delay $\Delta t_1$ or respectively $\Delta t_2$ in the measured value processing in the tire pressure control device leads according to the invention readily to the angular position, in which the tire pressure control device sends its telegrams, varying depending on the speed of the vehicle. It is thereby ensured that by far most of the telegrams which are sent are received in usable quality by the central unit.

A comparison of the allocation method according to the invention with other most up-to-date allocation methods, in which rotation speeds or rotation angles are compared with one another, which are delivered on the one hand by sensors in the tire pressure control devices and on the other hand by ABS sensors, shows that the method according to the invention achieves the desired allocation substantially more quickly and in a more energy-saving manner.

As first sensors, expediently, as also in the prior art, ABS sensors are used, of which in each case one ABS sensor is fixedly allocated to one of the wheel positions of the vehicle. As second sensor, which is required in the tire pressure control device, such a sensor can be used which delivers a signal with a periodic development. The period shall be constant, as long as the vehicle moves with a constant speed in a straight line or in a curve with a constant curve radius. In particular, acceleration sensors, which respond on the one hand to the centrifugal acceleration occurring at the wheel and on the other hand to the gravitational acceleration, fulfil this requirement. Whilst the direction of the gravitational acceleration remains the same, the direction changes in the course of each revolution of the wheel. The gravitational acceleration overlies the centrifugal acceleration and modulates it approximately sinusoidally, so that, from the development of the resulting acceleration, a conclusion can be drawn regarding the rotation speed of the wheel.

Another possibility to establish the rotation speed of the wheel through a sensor provided in the tire pressure control device consists in using a sensor which responds to the deformation of the tread of the tire when the tire pressure control device enters into the shuffle of the tire and emerges from the shuffle again, which occurs on every revolution of the wheel. A sensor with which this is possible is disclosed e.g. in DE 10 2010 038 136 A1. The first time interval $\Delta t_1$, in which the measurand detected by the second sensor is filtered in the wheel electronics, basically does not have to be constant, but is expediently constant, especially since for the duration of the low pass filtering and for the storing of the result of the low pass filtering one can assume a constant time requirement.

The second time interval $\Delta t_2$, the beginning of which coincides with the beginning of the first time interval $\Delta t_1$, basically does not have to be constant, but can particularly be constant, because already thereby in connection with changing speeds of the vehicle or respectively with changing rotation speeds of the wheels it is achieved that the tire pressure control devices send their signals to the central unit from different angular positions of the wheels and ensure that no tire pressure control device sends telegrams permanently or over a lengthy time from unfavourable angular positions of the wheel, which the central unit does not receive, or receives too weakly or incompletely.

The second time interval $\Delta t_2$ cannot end before the first time interval $\Delta t_1$, but can end later. Particularly, the first time interval $\Delta t_1$ and the second time interval $\Delta t_2$ coincide, for the sake of simplicity.

The end of the first time interval $\Delta t_1$ can be placed so that it coincides with the moment at which the end of the filtered development of the measurand detected by the second sensor has left the low pass filter and the filtered development is stored in the tire pressure control device, which takes place practically simultaneously.

The second sensor in the tire pressure control devices may detect its measurand several times, in each case for a second time span T2, which the wheel requires in order to rotate at least about 180°, in particular in order to rotate about a whole-number multiple of 180°, particularly about 720° (that is two full revolutions). In this case, the end of the first time span $\Delta t_1$ lies respectively at the end of a period of the filtered measurand, particularly at a point in time which is able to be determined in the simplest and best reproducible manner in the chronological development of the measurand. With an acceleration sensor, this would be the case when the tire pressure control device is situated precisely at the highest point of its path (12 o'clock position) or at the lowest point of its path (6 o'clock position) or in the 3 o'clock position or in the 9 o'clock position. With a sensor which responds to the deformation of the tread in the tread shuffle of the tire, the start and end of the time interval $\Delta t_1$ would be placed in the characteristic point in the development of the second measurand which is either caused by the entry of the tire pressure control device into the shuffle or by the exit of the tire pressure control device from the shuffle.

The first time interval $\Delta t_1$, in which the development of the measurand detected by the second sensor is subjected to a low pass filtering in the tire pressure control devices, or the rotation angle $\Delta\phi$, about which the wheel has further rotated during the first time interval $\Delta t_1$ and/or the second time interval $\Delta t_2$, can be given as known to the central unit. This presents itself in particular for the case where the time intervals $\Delta t_1$ and $\Delta t_2$ are selected to be constant. The central unit then knows with each signal or telegram, which it receives from a tire pressure control device on carrying out the method according to the invention, in which time period the second sensor has measured the measurand which forms the basis of the transmitted second measured value M2. This is important for the central unit, in order to decide which time period of the rotation speed measurement by means of ABS sensors it draws upon for a comparison with the second measured value M2.

The first time interval $\Delta t_1$ and/or the second time interval $\Delta t_2$ can be transmitted to the central unit but also as a third measured value M3, and namely respectively together with the identification and with the filtered measurand or with the second measured value M2 derived therefrom. This has the advantage that the tire pressure control devices can change the time intervals $\Delta t_1$ and $\Delta t_2$ autonomously, i.e. depending on the rotation speed, in order to optimize in the respective tire pressure control device the detecting of the measurand from which the rotation speed of the respective wheel can be derived.

The measured value M2 obtained in the tire pressure control device, if applicable also the measured value M3, can additionally be used in the central unit in order to determine the angular position which the wheel had at the end of the first time interval $\Delta t_1$ and/or at the end of the second time interval $\Delta t_2$. This can be used on comparing the measured value M2 with the measured values M1 obtained by the ABS sensors, in order to optimize the informative value of the comparison. In addition, the central unit can conclude, with the aid of the measured value M3 supported by experiences, as to whether the tire pressure control device at the moment of transmittal was situated in a favourable or unfavourable position for transmittal, and can include this into the evaluation of the informative value of the comparison for determining the correct allocation.

There are advantages when the tire pressure control device has the possibility to select the duration of the first time interval $\Delta t_1$ in which in the tire pressure control device the detected measurand is subjected to a low pass filtering, and/or the duration of the second time interval $\Delta t_2$ depending on speed or depending on the rotation speed of the respective wheel, and namely such that the duration of the first time interval $\Delta t_1$ and/or the duration of the second time interval $\Delta t_2$ decreases with increasing speed of the vehicle. This adaptation to the speed of the vehicle or respectively to the rotation speed of the respective wheel can take place in stages or continuously. Particularly, the adaptation takes place in stages, in particular in two or three stages distributed over the entire speed range or respectively the rotation speed range of the wheel. Thereby, it can be achieved that the angular displacement of the tire pressure control device between the end of the measurement interval and the transmission moment, i.e. the angle about which the wheel rotates further in the second time interval $\Delta t_2$, is restricted to the range of 0° to 180°. This restriction can be utilized e.g. so that the tire pressure control device transmits the second measured values M2 twice to the central unit, and namely for the first time at the end of the second time interval $\Delta t_2$ and for the second time after a further rotation of the wheel and of the tire pressure control device about less than one revolution, in particular after a further rotation of the wheel about a half revolution of the wheel. In this way, it can be ensured that at least one of the two transmittals of one and the same measured value M2 takes place from a position of the tire pressure control device which is favourable for reception by the central unit. This contributes to the allocation method according to the invention being able to be terminated substantially more quickly than competing methods in the prior art.

A central unit may be used in which for each wheel position more than one identification can be, and particularly is, stored. This makes it possible to store the identifications for at least two sets of wheels, e.g. for a set of summer wheels and for a set of winter wheels, so that with a changeover from summer wheels to winter wheels the identifications of the exchanged tire pressure control devices are already present in the central unit.

The first sensors, that is the sensors fixedly allocated to the wheel positions, particularly ABS sensors, measure the rotation speed or respectively the angular speed of the wheel or a value proportional to the rotation speed or respectively angular speed. The measured values are stored for a predetermined duration for the purpose of comparison with the corresponding measured values which are delivered by the tire pressure control devices. The storage can take place in the central unit, but it can also take place in a separate memory which the central unit can access. The measured values M1 of the first sensors can be stored for a first time span T1, which is twice to five times as long as the predetermined time segment $\Delta T$ for the measuring of the rotation speed or respectively angular speed of the respective wheel by the first sensor. This time span T1 is sufficient in order to carry out the comparison of the first measured values M1 with the second measured values M2 obtained in a timely manner in the tire pressure control devices and requires only a modest memory capacity. The time segment $\Delta T$ for the individual rotation speed measurements or respectively angular speed measurements by the first sensor can be between 10 ms (milliseconds) and 100 ms, expediently between 10 ms and 50 ms and in particular between 15 ms and 30 ms. That is favourable for the determining of the first measured values M1 which were detected in a timely manner to the second measured values M2 of the tire pressure control device.

In normal operation of the tire pressure control system, in which only identifications which are already stored in correctly allocated manner in the central unit are transmitted to the central unit from all tire pressure control devices, the tire pressure control devices send in relatively large time intervals, e.g. once per minute, if a rapid drop in pressure is not detected. In the allocation method according to the invention, the tire pressure control devices are to transmit in shorter time intervals, however, ideally after each two wheel revolutions, until the tire pressure control devices are allocated to the wheel positions.

The predetermined rotation angle ϕ about which the wheels are to rotate for the determining of the second measured value with the second sensor, can be selected so that the measuring always begins in a predetermined angular position of the second sensor, in particular in a rotation angle position in which the alternating component of the amplitude of the filtered measurement signal of the second sensor has a zero crossing. When the second sensor is an acceleration sensor, then expediently in the 3 o'clock position or in the 9 o'clock position of the tire pressure control device, because in this position the alternating component of the amplitude of the filtered acceleration signal of the second sensor has a zero crossing which is particularly simple to determine. This determining can be carried out autonomously in the tire pressure control device, so that the measurement- and evaluation circuit provided in the tire pressure control device, after activation by an internal clock or by the acceleration sensor announcing the start of a journey, can set itself automatically to the desired time interval, therefore e.g. beginning in the 3 o'clock position of the tire pressure control device. When as second sensor, instead of an acceleration sensor, a sensor is used which responds to the deformation of the tread of the tire, the measurement- and evaluation circuit would set itself automatically either to the entry of the tire pressure control device into the shuffle or to the exit of the tire pressure control device from the shuffle, which are likewise able to be established easily. This setting expediently does not take place by means of the unfiltered measurement signal of the second sensor, but rather by means of the filtered signal. For this, the low pass filter can be configured as a digital low pass filter. Digital low pass filters are known to the specialist in the art, they can be realized without especial expenditure by means of a microprocessor or microcontroller or suchlike digital arithmetic circuit which is usually present in a tire pressure control device.

When the measurement- and evaluation circuit with the second sensor is activated once, the measurand, which is a measurement for the rotation speed or respectively for the angular speed of the wheel, is measured continuously and evaluated continuously for a predetermined number of periods—or, in other words, for a predetermined number of revolutions—and namely in particular for each two successive periods. Only when these two periods coincide within a predetermined tolerance threshold, which signifies a constant speed of the wheel, is the second measured value M2, resulting from the length of the period and which is a measurement for the rotation speed or angular speed, transmitted to the central unit. If the difference between the two period lengths is greater than the predetermined tolerance, the measurement is not used for determining the allocations and the battery of the tire pressure control device is conserved.

The rotation speed or angular speed of the wheel, which is calculated from the predetermined rotation angle $\phi$ and the second time span T2 required for this, can be transmitted to the central unit from the tire pressure control device at the end of the second time interval $\Delta t_2$ together with the identification of the tire pressure control device and if applicable together with the second time interval $\Delta t_2$ or with the rotation angle $\Delta\phi$, about which the wheel has further rotated during the second time interval $\Delta t_2$. Alternatively, the second time span T2, which the wheel has required for a rotation about the predetermined rotation angle $\phi$, can be transmitted to the central unit as a measurement for the rotation speed or the angular speed of the wheel. The central unit therefore has all the data which it requires for the comparison with the rotation speeds which are transmitted to the central unit from the fixed first sensors.

The low pass filter which is used for the filtering expediently has a threshold frequency between 1 Hz and 5 Hz. Such a threshold frequency has proved to be successful for the present purpose.

The results of the comparisons of the rotation speeds or respectively angular speeds obtained from the first sensors and from the second sensors are particularly evaluated statistically. The aim to be achieved is not that a single run of the method already enables the exact allocation. Rather, it is more advantageous to run the method as many times until a statistical evaluation of the results permits a reliable allocation. The allocations of the identifications to a particular wheel position obtained in each run of the method are collected and analysed according to the frequency of their occurrence. For each wheel position, the identification which is allocated to it the most frequently is then finally stored as the correct one.

In the case of a vehicle with four wheels there are 16 different allocation possibilities. These can be arranged—figuratively speaking—in a matrix. The allocations obtained in each run of the method can now be entered as results into the 16 fields of the matrix. With an increasing number of runs of the method, the correct allocation of an identification to a particular wheel position will reveal itself in the matrix in that its number of results is significantly higher than in the other three possible allocations. In the statistical evaluation in the central unit, a criterion can be provided, which must be fulfilled in order to be able to complete the allocation method. The criterion could be, for example, that an allocation of an identification to a particular wheel position is classified as correct when it has occurred at least five times as frequently as the allocation of the other three identifications to the same wheel position. The choice of the factor "5" is only an example, it depends on the degree of certainty which is desired and can be altered by experiences undergone with the method.

When every identification is allocated to a wheel position in this way, the method can be terminated and the allocations can be finally stored.

When the next allocation method is carried out depends on the specifications of the vehicle manufacturer. Generally, the allocation method is started every time when the vehicle is newly started up. In vehicles which automatically switch the engine off when stopped at red traffic lights to reduce fuel consumption and the amount of exhaust gas, and which start up again by actuating the gas pedal, one will naturally wish to exclude the renewed start of the allocation method, and for this purpose one will only carry out a renewed start of the allocation method when the period when the vehicle is not in use has exceeded a particular minimum duration. In any case, however, the allocation method is always started when, after a lengthy period of non-use of the vehicle one or more identifications which are different from the last allocated identifications are transmitted repeatedly to the central unit.

Once allocations are stored in the central unit, the possibility exists to shorten the allocation method on a renewed start-up of the vehicle and e.g. to terminate it when the identification which was already stored hitherto under the same wheel position is transmitted again several times to the central unit to the given wheel positions. The number of runs of the method which are at least to take place after a renewed start-up of the vehicle can be predetermined by the vehicle manufacturer. A shortening of the allocation method is able to increase the lifespan of the batteries present in the tire pressure control devices, which are generally not exchangeable.

BRIEF DESCRIPTION OF THE DRAWINGS

The enclosed drawings serve for further explanation of the invention.

DETAILED DESCRIPTION OF THE PREFERRED EMBODIMENTS

Figure 1:
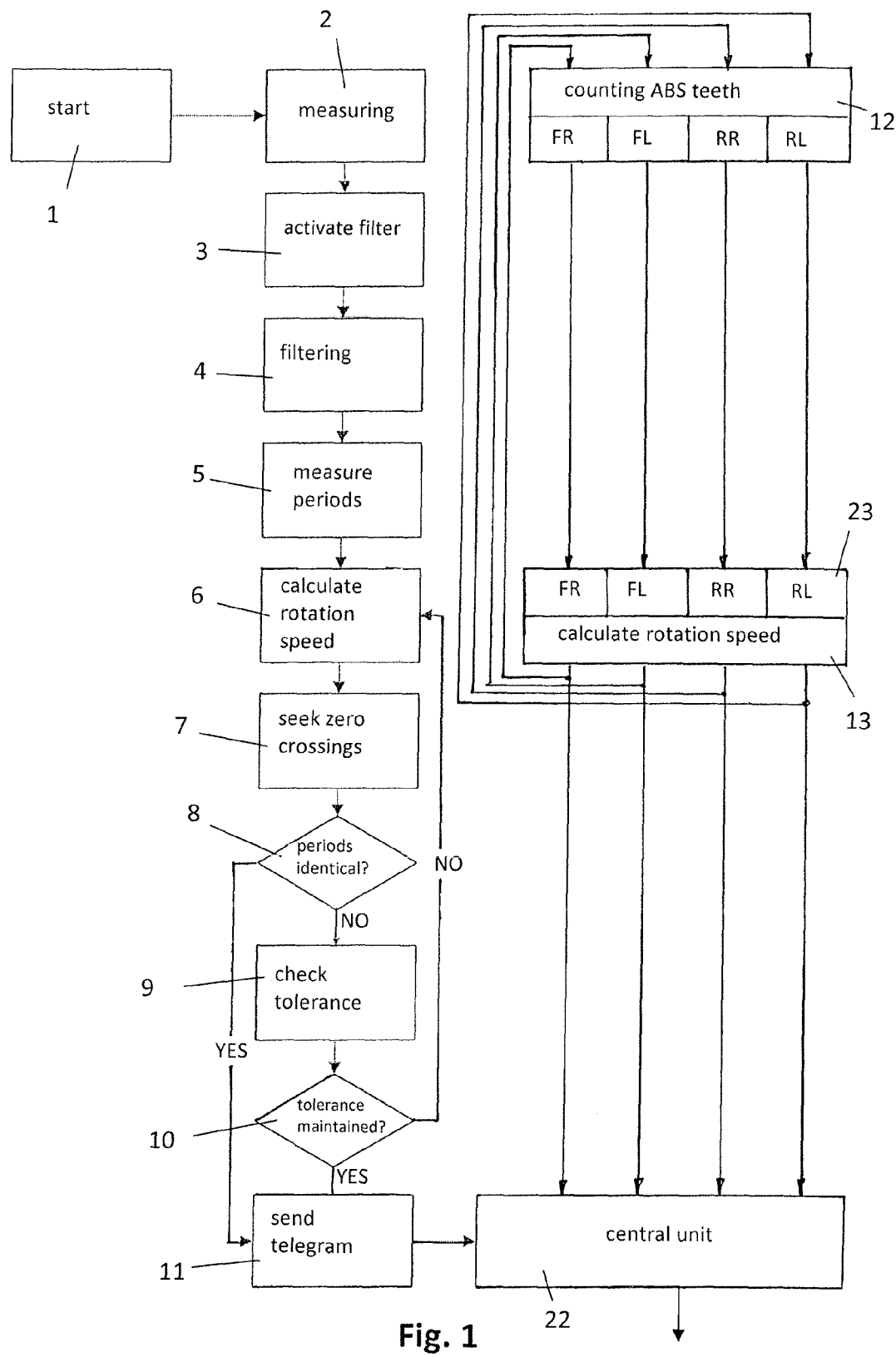
FIG. 1 shows in a flow diagram the obtaining of measured values which are a measurement for the rotation speed or respectively for the angular speed of wheels of a vehicle, on the one hand by means of ABS sensors and on the other hand by means of tire pressure control devices, and the transmitting of these signals to a central unit.

According to FIG. 1, the method begins in the tire pressure control device of a wheel which is mounted on a vehicle, in step 1 with a start signal which is generated in the tire pressure control device itself, e.g. in that an acceleration sensor establishes that the wheel is rotating after it was not able to establish a movement for a predetermined duration, e.g. more than half an hour. Triggered by the start signal, in a step 2 the acceleration occurring at the tire pressure control device is begun to be measured continuously and the acceleration measured values are begun to be stored pointwise respectively for the duration of a predetermined number of periods.

The pointwise storage can take place so that an analog acceleration signal delivered by the acceleration sensor is scanned pointwise, in particular in constant time intervals, and the discrete acceleration values ascertained in this way for a predetermined number of periods of the acceleration signal are stored in the tire pressure control device. The chronological development of the acceleration is then present pointwise in the memory. This is advantageous for a digital further processing.

In a step 3 a digital low pass filter is activated, which in a step 4 subjects the pointwise stored development of the signal of the acceleration sensor to a digital low pass filtering. The filtered acceleration signal is likewise present as a sequence of discrete acceleration values and has an approximately sinusoidal development, superimposed by the constant gravitational acceleration as offset. The length of the period of the filtered acceleration signal is inversely proportional to the rotation speed of the wheel.

Already the observing of only a half period of the acceleration signal permits a statement as to the rotation speed of the wheel. A more precise statement is possible, however, when not only a half period of the acceleration signal is evaluated, but rather a greater length of the acceleration signal. It is in particular possible to evaluate respectively two periods of the acceleration signal. Therefore, in a step 5 the length of the period is measured for a segment of the filtered acceleration signal which is two periods long, and in a step 6 the rotation speed of the wheel is calculated therefrom.

In a step 7 the beginning and the end of the two periods of the filtered acceleration signal are sought. The beginning and the end of a period can be best established in a sinusoidal development by means of the zero crossings of the development. This takes place in step 7 by calculation, by either the development of the filtered acceleration signal being differentiated and the extreme values of the development being sought, or by the offset originating from the gravitational acceleration being eliminated in the development of the acceleration signal and the zero points of the remaining alternating component of the acceleration signal being sought.

In a step 8 the duration of the first period and the duration of the second period of the acceleration sensor are measured and compared with one another. If they are identical, in a step 11 the measured value determined from the two periods, which is a measurement for the rotation speed of the wheel and which is the "second" measured value M2 in the sense of the claims, is transmitted by radio to the central unit 22. The radiotelegram transmitted to the central unit 22 contains in addition the identification of the tire pressure control device and particularly the duration of the "second" measurement interval $\Delta t_2$, by which the transmittal of the radiotelegram is delayed with respect to the end of the second period of the acceleration signal detected in real time by the acceleration sensor. This second time interval $\Delta t_2$ is sufficiently long in order to enable the filtering of the acceleration signal and the measuring and testing of the period lengths.

After the transmittal of the radiotelegram to the central unit, the stored data of the two evaluated periods of the acceleration signal are deleted in the tire pressure control device, in particular in that they are overwritten with the data of the two subsequent periods of the acceleration signal.

If it is found on comparing the durations of the two periods of the acceleration signal that they deviate from one another, in a step 9 the extent of the deviation is determined and is compared with a predetermined tolerance value in a step 10. If the difference of the two periods is not greater than the predetermined tolerance value, the "second" measured value determined from the two periods is transmitted to the central unit 22 in step 11.

If, however, on comparing the durations of the two periods in step 8 it is found that they deviate from one another by more than the predetermined tolerance value, these two periods of the acceleration signal are discarded and the method is continued with the step 6, in which the rotation speed of the wheel is determined from the two successive periods of the acceleration signal.

The time interval $\Delta t_2$ can be given as known to the central unit when it is not possible in the control of the tire pressure control device to change the time interval $\Delta t_2$ autonomously. In this case, the duration of the second time interval $\Delta t_2$ does not have to be also transmitted to the central unit in the radiotelegram.

When the tire pressure control device is programmed so that it always evaluates two revolutions of the wheel in order to determine the rotation speed, which corresponds to a rotation angle $\phi=720°$, this can also be given as known to the central unit. The central unit can calculate from the rotation angle $\phi$ and the transmitted measured value of the rotation speed the duration of the second time span T2, which the wheel has used for the two revolutions, and from the time interval $\Delta t_2$ which is also transmitted, the central unit can determine how long ago the period of time was for which the tire pressure control device has determined the rotation speed. This is of importance for the subsequent comparison of the rotation speed transmitted by the tire pressure control device with the rotation speeds or angular speeds determined by the stationary second sensors.

The measurements by the ABS sensors which are fixedly allocated to the wheel positions take place chronologically independently of the steps occurring in the tire pressure control device. For a vehicle with four wheels there are four ABS sensors for the positions front right (FR), front left (FL), rear right (RR) and rear left (RL). Each ABS sensor counts in a step 12 independently of the other ABS sensors and independently of the tire pressure control devices e.g. the teeth, running past it, of a toothed ring rotating with the wheel repeatedly in successive constant time segments $\Delta T$, which can be given as known to the central unit 22. In a processing unit 23 the rotation speeds or angular speeds can be calculated therefrom in a step 13 for the different wheel positions. The processing unit 23 can be allocated to the ABS sensor or to the central unit 22.

Alternatively, it is possible for the determining of the rotation speed or of the angular speed to not take as the basis identical time segments $\Delta T$, but rather for a predetermined number of teeth, in particular for the entire number of teeth of the ABS toothed ring, to determine the time span $\Delta T$ which is required in order to count the predetermined number of teeth of the ABS toothed ring. In this case, instead of the number of teeth, the variable time segments $\Delta T$ must be transmitted to the central unit 22, whereas the total number of teeth of the ABS toothed ring can be given as known to the central unit 22.

In order to determine the correct allocations, the central unit 22 on the one hand can access the data transmitted by the tire pressure control devices, which contain the identification, the rotation speed or the angular speed of the tire pressure control device and the associated time period of their detection, namely the second measured values M2, and on the other hand can access the rotation speeds or angular speeds originating from the ABS sensors, that is the first measured values M1, connected with the time period for which they were determined.

Figure 2:
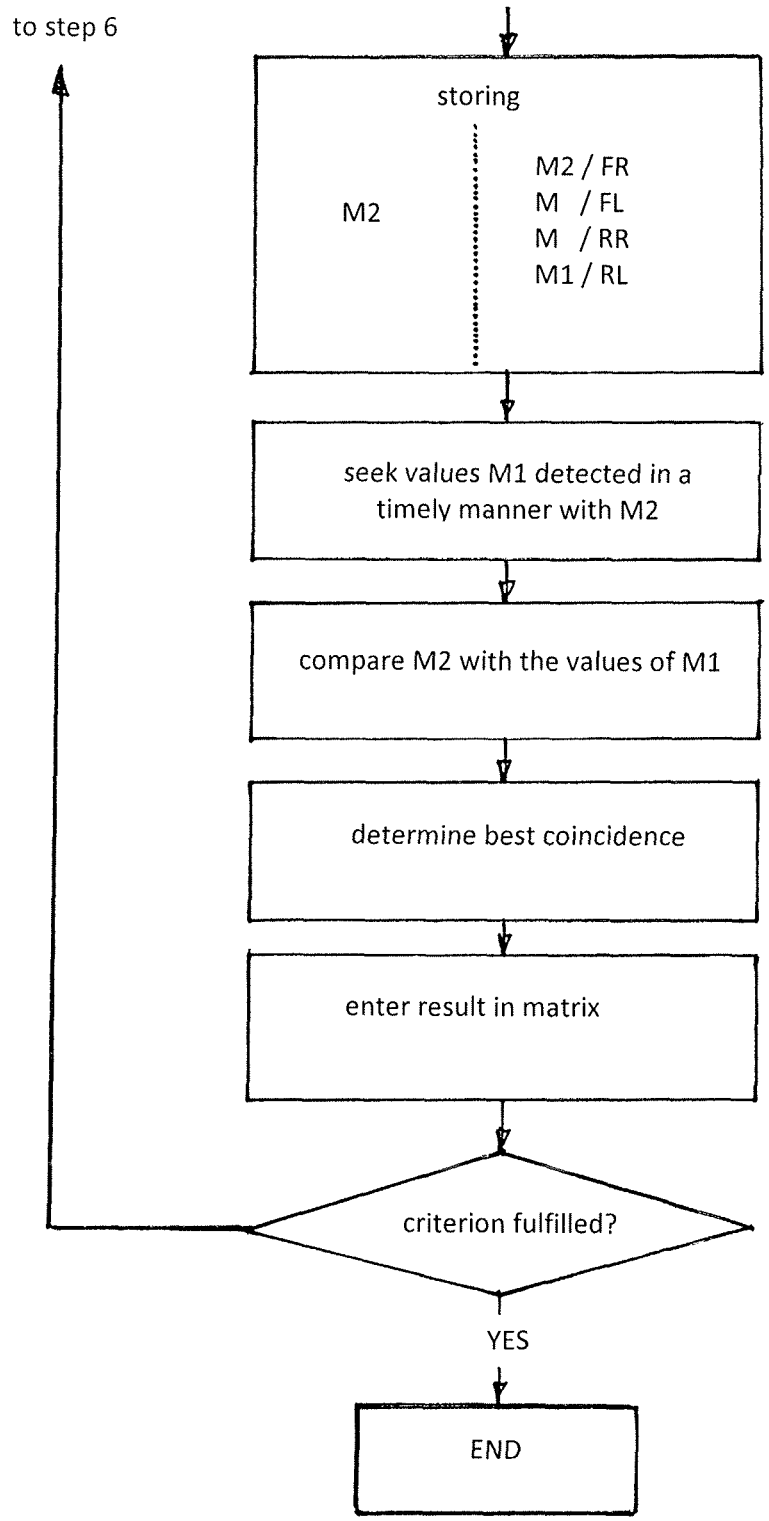
FIG. 2 shows a flow diagram following the flow diagram of FIG. 1, for the evaluation of the measured values obtained according to FIG. 1 in the central unit.

The method explained by means of FIG. 1 continues in the method sequence illustrated in FIG. 2. The first measured values M1 originating from the ABS sensors are stored for successive time spans $\Delta T$ in the central unit 22 under the associated wheel position FR or respectively FL or respectively RR or respectively RL. This takes place in step 13 or 14. The second measured values M2, transmitted in a timely manner by the tire pressure control devices, are stored in step 14 in the central unit 22. In FIG. 2, in step 14 only the signal M2 from one of the tire pressure control devices is indicated, for the sake of clarity.

In the next step 15, the central unit 22 compares the time indications linked with the measured values and establishes which of the measured values M1 originating from the four ABS sensors were detected contemporaneously or in a timely manner with the measured value M2 of the one tire pressure control device. These measured values M1 are selected in step 15 and are compared with the measured value M2 in step 16.

In step 17 the identification belonging to the measured value M2 is stored under that of the four wheel positions, the measured value M1 of which shows the least deviation from the measured value M2. The storage takes place in a matrix which contains a counter for each possible allocation, i.e. a total of 16 counters. If it was established by the comparison in step 16 therefore e.g. that the measured value M2, which is linked with a particular identification, coincides best with the feature M1, which is linked with the position FL, then the counter status is increased by ONE in the counter which is allocated to the particular identification and to the position FL. This is carried out repeatedly for each measured value M2 transmitted by the tire pressure control devices and for each coincidence of a measured value M2 with one of the measured values M1 the counter status is increased by ONE in the counter which is allocated to the associated identification and the corresponding wheel position. This takes place in step 18.

After the step 18, the first measured values M1, which form the basis of the entry into the matrix, can be deleted, in particular in that they are overwritten with the subsequent first measured values M1.

In a step 19 after each increase of a counter status a check is made as to whether in the four counters, which are allocated to one of the four wheel positions, one of the four identifications has reached a counter status which is significantly higher than the counter status reached for the other three identifications. As long as this is not the case, the method according to FIG. 1 is not terminated for the corresponding tire pressure control device. If, however, the counter status for an identification paired with a particular wheel position has increased significantly above the three other counter statuses for the same wheel position, the identification is stored under the corresponding wheel position in the step 20, and in a step 21 the allocation method for the respective wheel position is terminated by a radio signal sent from the central unit 22 to the corresponding tire pressure control device. Thereafter, only the normal tire pressure control takes place in the allocated tire pressure control device.

The terminating of the allocation method can be decided and brought about separately for the four tire pressure control devices. As soon as three allocations have fulfilled the criterion for the termination of the allocation method, the method for the fourth and final allocation can also be terminated, because the final allocation inevitably results from the three previous allocations.

The allocation methods can, however, also be terminated simultaneously.

Figure 3:
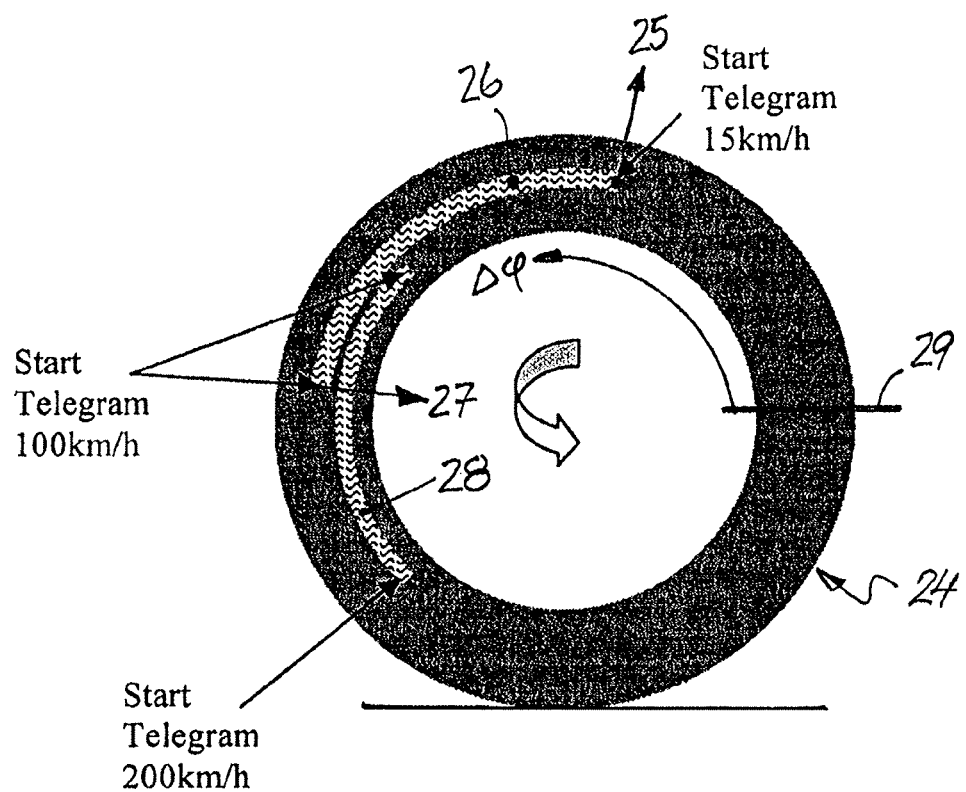
FIG. 3 shows diagrammatically in an example how on a rotating wheel the position of the tire pressure control device rotates further in the time interval $\Delta t_2$ between the detection of a measurand, from which the rotation speed or the angular speed of a wheel can be derived, and the transmittal of a measured value, obtained therefrom, by the tire pressure control device to the central unit.

FIG. 3 shows diagrammatically about which angle $\Delta \phi$ a wheel 24, rotating anti-clockwise, rotates further anti-clockwise in the time interval $\Delta t_2$, which passes between the end of the detecting of a measurand from which the rotation speed of the wheel 24 can be derived and the sending of the second measured value M2 obtained therefrom. At a speed of approximately 15 km/h, the tire pressure control device is activated. It is assumed that the tire pressure control device at 15 km/h sends from the angular position 25 which lies at the beginning of the path 26. Whilst the speed increases up to 100 km/h, the position from which the tire pressure control sends travels along the path 26 anti-clockwise up to the position 27. On exceeding 100 km/h or respectively on exceeding a wheel rotation speed corresponding to this speed, which is determined by means of the acceleration sensor in the tire pressure control device, this shortens the time interval $\Delta t_2$ in a stage so that at speeds between 100 km/h and e.g. 200 km/h the position of the sending tire pressure control device moves along the path 28. The illustrated movement takes place for the two speed ranges respectively provided that the tire pressure control device, at the end of the detecting of the measurand from which the rotation speed can be derived, is always situated in the same angular position, e.g. in the 3 o'clock position 29.

In summary, the invention relates to a method for the allocating of tire pressure control devices of a tire pressure control system of a vehicle to the different wheel positions at which respectively a wheel of the vehicle is mounted. First sensors, which are fixedly allocated to the wheel positions, deliver repeatedly a measured value M1, which is a measurement for the rotation speed of the wheel to which the respective first sensor is allocated. In each tire pressure control device the development of a measurand, from which the rotation speed of the associated wheel can be derived, is detected in a pointwise manner by means of a second sensor over a predetermined rotation angle $\phi$ of the wheel as a function of time, is subjected to a low pass filtering in a subsequent first time interval $\Delta t1$ and from the filtered development of the measurand a second measured value M2 is determined, which is a measurement for the rotation speed or respectively for the angular speed of the associated wheel. Each tire pressure control device transmits at the end of a second time interval Δt2, the duration of which is not less than the first time interval Δt1, the second measured value M2 together with an identification of the tire pressure control device to a central unit; in the central unit, as a result of this transmittal, the second measured values M2 transmitted by the tire pressure control devices are compared with the measured values M2 detected in a timely manner by the first sensors of all wheels, and the identification of the tire pressure control device is stored under that wheel position in which the measured value M1 delivered by the first sensor best coincides with the measured value M2.

NUMERALS 1-21 steps
22 central unit
23 processing unit
24 wheel
25 angular position
26 path
27 position
28 path
29 3 o'clock position
M1 first measured value
M2 second measured value
T1 first time span
T2 second time span
ΔT time segment
$\Delta t_1$ first time interval
$\Delta t_2$ second time interval
φ predetermined rotation angle
ΔT displacement of an angular position caused by $\Delta t_2$

What is claimed is:

1. A method for the allocating of tire pressure control devices of a tire pressure control system of a vehicle to the different positions at which respectively a wheel of the vehicle is mounted, automatically by the tire pressure control system, the method comprising the steps of:
providing the tire pressure control system, the system comprising:
a number of first sensors, corresponding to the number of wheel positions, which are each fixedly allocated to one of the wheel positions and can detect a rotation speed or an angular speed of the wheel which is mounted in the wheel position;
a number of tire pressure control devices, coinciding with the number of the mounted wheels, which devices are mounted on the wheels rotating together with these, are provided with an individual identification and contain a second sensor for determining a measurand, from the chronological development of which the rotation speed of the respective wheel or the angular speed of the wheel can be derived;
a central unit, in which the allocation of the tire pressure control devices to respectively one wheel position, namely the identification of the tire pressure control device situated in the wheel position in connection with the associated wheel position, can be stored;
wherein it is known by the central unit from this method which first sensor is allocated to which wheel position;
delivering, by the first sensors, repeatedly a measured value M1 for successive time segments ΔT, the measured value M1 being a measurement for the rotation speed or for the angular speed of the wheel to which the respective first sensor is allocated;
sending, by the tire pressure control devices, their individual identification to the central unit in chronological intervals;
wherein in each rotating tire pressure control device there are performed the steps of:
detecting, by each rotating tire pressure control device, pointwise the development of the measurand from which the rotation speed or the angular speed of the associated wheel can be derived by means of the second sensor over a predetermined rotation angle φ of the wheel as a function of time;
low pass filtering, by each rotating tire pressure control device, of the chronological development of the measurand in a first time interval $\Delta t_1$ following the detection of the measurand detected during the rotation of the wheel about the predetermined rotation angle φ;
storing, by each rotating tire pressure control device, the result of the filtering;
determining, by each rotating tire pressure control device, a second measured value M2 from the filtered development of the measurand, which is a measurement for the rotation speed or respectively for the angular speed of the associated wheel in the range of the observed predetermined rotation angle φ;
transmitting, by each tire pressure control device, the second measured value M2 together with its identification to the central unit at the end of a second time interval $\Delta t_2$, the duration of which is not less than the first time interval $\Delta t_1$;
comparing, in the central unit as a result of this transmittal, the second measured values M2 transmitted by the tire pressure control devices with the measured values M1 detected in a timely manner by the first sensors of all wheels; and
storing, in the central unit, the identification of the tire pressure control device respectively under that wheel position in which the measured value M1 delivered by the first sensor best coincides with the measured value M2.

2. The method according to claim 1, wherein as first sensors anti-lock braking system (ABS) sensors are used, of which in each case one ABS sensor is allocated to one of the wheel positions of the vehicle.

3. The method according to claim 1, wherein the duration of the second time interval $\Delta t_2$ is constant.

4. The method according to claim 1, wherein the end of the first time interval $\Delta t_1$ is placed such that it coincides with the moment at which the end of the filtered development of the measurand detected by the second sensor has left the low pass filter and is stored in the tire pressure control device.

5. The method according to claim 1, wherein the measured value M2, if applicable also the measured value M3, is additionally used in the central unit in order to determine the angular position which the wheel has at the end of the first time interval $\Delta t_1$ and/or at the end of the second time interval $\Delta t_2$.

6. The method according to claim 1, wherein more than one identification is stored in the central unit for each wheel position.

7. The method according to claim 1, wherein the tire pressure control devices send in shorter time intervals in the allocation method than in a normal operation of the tire pressure control system, in which only identifications which are already stored in the central unit are transmitted to the central unit from all tire pressure control devices.

8. The method according to claim 1, in which a low pass filter is used, the threshold frequency of which lies between 1 Hz and 5 Hz.

9. The method according to claim 1, wherein as measured values M1 detected in a timely manner, those measured values M1 are selected which were measured in not more than five successive time segments ΔT, wherein the end of the second time interval $\Delta t_2$, in which in a tire pressure control device a low pass filtering of the development of the measurand detected by the second sensor and the transmittal of the second measured value M2 as well as the identification to the central unit takes place, lies in the no more than five time segments ΔT or at the boundary thereof.

10. The method according to claim 1, wherein the second measured values M2 are transmitted twice to the central unit, namely once at the end of the second time interval $\Delta t_2$ and a second time after a further rotation of the wheel about less than one revolution.

11. The method according to claim 1, wherein as second sensor such a sensor is used which delivers a signal with a periodic development, wherein the period is constant as long as the vehicle moves in a straight line with a constant speed.

12. The method according to claim 11, wherein as second sensors acceleration sensors are used, at least one of which is contained in each tire pressure control device.

13. The method according to claim 1, wherein as measured values M1 detected in a timely manner, those measured values are selected which were measured in several successive time segments ΔT, which overlap with the second time interval $\Delta t_2$ or lie at its boundary.

14. The method according to claim 13, wherein as measured values M1 detected in a timely manner, the measured values M1 are selected which were measured in two successive time segments ΔT.

15. The method according to claim 1, wherein it is carried out repeatedly, wherein the allocations obtained in each run of the method are collected in the central unit, wherein the collected allocations are analyzed according to the frequency of their occurrence, and wherein for each wheel position the identification is stored which is allocated to it the most frequently.

16. The method according to claim 15, wherein after a start of a journey it is then carried out in a shortened manner, i.e. with a smaller number of repetitions than with a storage for the first time of a particular allocation, if, to the given wheel positions, that identification, which was already stored during the preceding journey as the most frequent identification, is transmitted again to the central unit.

17. The method according to claim 1, wherein the first sensors measure the measurand, which is a measurement for the rotation speed or for the angular speed, and store the measurement result for a predetermined duration.

18. The method according to claim 17, wherein the measurement results of the first sensors are stored for a time span T1, which is twice to five times as long as the predetermined time segment ΔT for the individual measurement.

19. The method according to claim 17, wherein the time segment ΔT for the individual measurement lies between 10 ms and 100 ms.

20. The method according to claim 1, wherein the duration of the first time interval $\Delta t_1$ is constant.

21. The method according to claim 20, wherein the first time interval $\Delta t_1$ in which, in the tire pressure control devices, the development of the measurand detected by the second sensor is subjected to a low pass filtering, or the rotation angle Δϕ about which the wheel has further rotated during the first time interval $\Delta t_1$ and/or the second time interval $\Delta t_2$, is either given as known to the central unit or is transmitted to it as a third measured value M3 by the tire pressure control device together with its identification and with the filtered measurand or with the second measured value M2 derived therefrom.

22. The method according to claim 21, wherein the predetermined duration of the first time interval $\Delta t_1$ in which the detected measurand is subjected to a low pass filtering in the tire pressure control devices, and/or the duration of the second time interval $\Delta t_2$ is selected in a speed-dependent manner, and namely such that the duration of the first time interval $\Delta t_1$ and/or the duration of the second time interval $\Delta t_2$ decreases with increasing speed of the vehicle.

23. The method according to claim 22, wherein the predetermined duration of the first time interval $\Delta t_1$ and or the predetermined duration of the second time interval $\Delta t_2$ is adapted in stages or continuously to the speed of the vehicle or to the rotation speed or respectively angular speed of the wheel concerned.

24. The method according to claim 1, wherein in the tire pressure control devices the second sensor detects its measurand several times, in each case for a second time span T2, which the wheel requires in order to rotate about at least 180°.

25. The method according to claim 24, wherein in the tire pressure control devices the second sensor detects its measurand several times, in each case for a second time span T2, which the wheel requires in order to rotate about a whole-number multiple of 180°.

26. The method according to claim 24, wherein the predetermined rotation angle ϕ about which the wheels are to rotate for the detecting of the measurand of the second sensor, is selected so that the measuring begins in a predetermined rotation angle position of the second sensor.

27. The method according to claim 26, wherein in the tire pressure control devices the measurand detected by the second sensor is filtered by means of a digital low pass filter and that by means of the filtered signal the second time span T2 is measured which the wheel requires for its rotation about the predetermined rotation angle ϕ.

28. The method according to claim 27, wherein as measurement for the rotation speed or the angular speed of the wheel, the second time span T2 which the wheel required for a rotation about the predetermined rotation angle ϕ, or the rotation speed or angular speed of the wheel calculated from the predetermined rotation angle ϕ and the second time span T2 required therefor in the tire pressure control device at the end of the second time interval $\Delta t_2$ together with the identification of the tire pressure control device and if applicable together with the second time interval $\Delta t_2$ or with the rotation angle Δϕ, about which the wheel has further rotated during the second time interval $\Delta t_2$, is transmitted to the central unit.

\* \* \* \* \*